(12) United States Patent
Coudrais et al.

(10) Patent No.: US 6,481,943 B2
(45) Date of Patent: Nov. 19, 2002

(54) HOLDING ELEMENT WITH EXPANDABLE COMPONENT

(75) Inventors: Thierry Coudrais, Bonneuil sur Marne (FR); Reimar Saltenberger, Schöffengrund-Niederwetz (DE)

(73) Assignee: Emhart LLC, Newark, DE (US)

( * ) Notice: Subject to any disclaimer, the term of this patent is extended or adjusted under 35 U.S.C. 154(b) by 0 days.

(21) Appl. No.: 09/815,991

(22) Filed: Mar. 23, 2001

(65) Prior Publication Data

US 2001/0024605 A1 Sep. 27, 2001

(51) Int. Cl.[7] ................................................ F16B 13/06
(52) U.S. Cl. ........................ 411/55; 411/900; 411/907; 411/908
(58) Field of Search ........................ 411/55, 302, 303, 411/301, 900–903, 907, 908

(56) References Cited

U.S. PATENT DOCUMENTS

| 2,525,736 | A | * | 10/1950 | Taylor |
| 3,014,563 | A | * | 12/1961 | Bratton |
| 3,021,927 | A | * | 2/1962 | McKee |
| 3,534,797 | A | * | 10/1970 | Reinhard |
| 4,019,550 | A | * | 4/1977 | DeHaitre |
| 4,022,262 | A | * | 5/1977 | Gunn |
| 4,108,043 | A | * | 8/1978 | Varga |
| 4,861,208 | A | * | 8/1989 | Boundy |
| 4,906,148 | A | * | 3/1990 | Schule |
| 5,033,909 | A | * | 7/1991 | McCartney |
| 5,271,700 | A | * | 12/1993 | Le Goff |
| 5,725,343 | A | * | 3/1998 | Smith |

* cited by examiner

*Primary Examiner*—Flemming Saether
(74) *Attorney, Agent, or Firm*—Edward D. Murphy

(57) ABSTRACT

A holding element 1, for fastening a component 18 to a carrier 4 having an opening 3, includes an insertion piece 2 made of a soft elastic plastics material, and a thrust part 11 made of a rigid plastics material. The insertion piece 2 is formed with a bevelled or cone shaped thrust face 12, which is held in interfacing engagement with a complimentarily bevelled or conically shaped thrust face 7 of the thrust part 11 by elastically deformable ribs 13 and 14. When a screw 15 is inserted through a longitudinal bore 8 of the insertion piece 2 and into an axially aligned bore 10 of the thrust part 11, and is tightened, the insertion piece is compressed to expand radially to anchor the holding element 1 within the opening 3 of the carrier 4.

2 Claims, 2 Drawing Sheets

HOLDING ELEMENT WITH EXPANDABLE COMPONENT

BACKGROUND OF THE INVENTION

This invention relates to a holding element for fastening components to a carrier, and particularly relates to a holding element for fastening components to a carrier which is formed with an opening.

As shown in European Patent Application No. 890 750 A2, a known holding element, which is to be assembled with a carrier, is constructed integrally in the manner of a plug. The holding element is formed with a shank and a flange, at one end of the shank, and a bore which extends axially through the flange and into the shank. A bead is formed on the shank and is spaced from the flange. The distance between the bead and a spaced facing portion of the flange corresponds to the thickness of the respective carrier.

When assembling the holding element with the carrier, the shank is placed through an opening in the carrier, with the flange engaging one side of the carrier. As the holding element is being assembled with the carrier, the bead is compressed as it passes through the opening of the carrier, and then returns to its normal uncompressed state as the bead clears the opening. In this manner, the portion of the carrier which surrounds the opening thereof is, in effect, captured between the flange and the bead. A screw is then inserted through an opening formed in a component which is to be assembled with the carrier. The threaded portion of the screw is threadedly assembled within the bore of the holding element. During the threaded assembling of the screw, the screw exerts a radially outward pressure against the portion of the shank which is contained within the opening of the carrier, thereby providing a tight seal against the wall of the opening. Also, the head of the screw presses the component against the flange, to complete the assembly of the component with the carrier.

In order to firmly support the screw within the bore of the holding element, the elasticity of the material of the shank must not be too soft. In order to provide for the compression of the bead as the holding element is being assembled with the carrier, the region of the bead should be a soft material. However, a soft material would not provide adequate support for the screw.

Thus, there is a need for a holding element, used for mounting a component with a carrier, which provides sufficient material compressibility for easy assembly of the holding element with the carrier, and sufficient material strength to facilitate firm assembly of a screw with the holding element.

SUMMARY OF THE INVENTION

It is, therefore, an object of this invention to provide a holding element which may be easily assembled on a carrier, yet provide high stability for the mounting of a screw therewith, thereby providing good support function for a component to be fastened with the carrier, and guaranteeing secure mounting and sealing of the holding element with the carrier.

With this and other objects in mind, this invention contemplates a holding element for fastening components to a carrier formed with an opening, in which the holding element is to be inserted and held. The holding element includes an insertion piece, which is insertable into the opening of the carrier, and which has a longitudinal insertion-piece bore extending therethrough. The insertion piece is formed with a collar at one end, which collar is to be supported against the carrier, and an insertion-piece thrust face formed at another end of the insertion piece. A thrust part is formed with a thrust-part longitudinal bore having an open end and a thrust-part thrust face formed adjacent the open end of the thrust-part bore. The insertion-piece thrust face and the thrust-part thrust face are in interfacing engagement, with the insertion-piece bore being in axial alignment with the thrust-part bore. The insertion piece is made of a soft elastic plastics material, and the thrust part is made of a material having the stability of a rigid plastics material, which is more rigid than the soft elastic plastics material of the insertion piece. When a screw is inserted through the insertion-piece bore and into the thrust-part bore, the insertion piece is compressed to expand within the opening of the carrier in a sealing manner to anchor the holding element with the carrier.

The two-piece construction of the holding element, and the matching configuration of the thrust faces of the insertion piece and the thrust part result, on the one hand, in ease of assembly because there is no need to provide a bead or the like on the insertion piece due to the compressive expansion of the insertion piece by the thrust part. Thus, the external contour of the holding element may be substantially smooth, thereby allowing it to be inserted into the opening of the carrier without difficulty. When the screw is tightened within the bores, the rigid thrust part is drawn or pressed against the softer insertion piece in the region of the matching thrust faces. This results in a strong radial pressure being applied to the insertion piece to snugly secure the insertion piece against the wall of the opening of the carrier to provide a reliable seal. The soft elasticity of the insertion piece does not impair the tight fit of the screw with the holding element because the screw is inserted into the rigid thrust part, with the result that a component pressed against the holding element by the screw may be attached securely and firmly to the carrier by the holding element.

The thrust face of the insertion piece is formed with a conical surface which is contiguous with the longitudinal bore in a direction away from the collar. The thrust face of the thrust part is formed with a cone surface, which is in interfacing and complimentary engagement with the thrust face of the insertion piece. When the screw is tightened, the thrust face of the rigid thrust part is pressed against the thrust face of the softer insertion piece, which compresses the insertion piece to expand radially outward against the wall of the opening of the carrier.

An elastic ring may be formed on the insertion piece, between the collar and the thrust part, which embraces a collar of the thrust part projecting into the ring. With such construction, the collar ensures that, when the elastic ring is compressed as a result of tightening the screw, the ring may expand only radially outward where it then presses against the wall of the opening of the carrier.

The collar of the insertion piece is designed in the shape of a dish, with a marginal lip around the periphery of the dish being positioned for application against the carrier when the insertion piece is assembled with the opening of the carrier. The dish configuration gives rise, on the one hand, to an efficient sealing between the holding element and the carrier and, on the other hand, to a stable abutment relative to the component to be fastened, and pressed toward the collar of the insertion piece by the screw.

In order to achieve retention of the insertion piece with the thrust part when forming the holding element, the insertion piece is connected to the thrust part by elastically deformable ribs. The ribs may be provided at random points in the region of contact between the insertion piece and the thrust part, such as, for example, at the outer edge of the cone surface of the thrust part. The ribs may be injection-molded onto the insertion piece and the thrust part.

The insertion piece and the thrust part are injection molded from plastics materials and, as stated above, a particularly elastic plastics material is to be selected for the insertion piece. During injection-molding of the holding element, both the extremely elastic insertion piece and the comparatively more rigid thrust part may be formed in one mold, in which case the ribs connecting the insertion piece and the thrust part may be molded in place at the same time.

Other objects, features and advantages of the present invention will become more fully apparent from the following detailed description of the preferred embodiment, the appended claims and the accompanying drawings.

DETAILED DESCRIPTION OF THE PREFERRED EMBODIMENTS OF THE INVENTION

Figure 1:
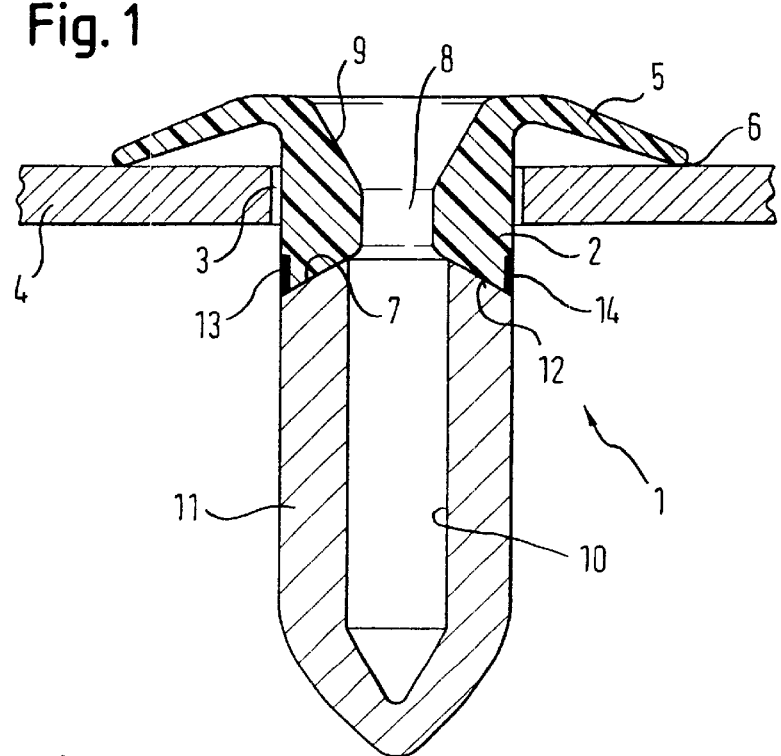
FIG. 1 is a sectional view showing a first embodiment of a holding element which includes an insertion piece and a thrust part in accordance with certain principles of the invention.

As shown in FIG. 1, a first embodiment of a holding element 1 includes a plug-like thrust part 11 and an insertion piece 2, a portion of which is inserted into an opening 3 formed in a plate of a carrier 4. The insertion piece 2 is formed, at one end thereof, with a dish-like collar 5 having a marginal lip 6, which is in engagement with a surface portion of the carrier 4 near the opening 3, when the portion of the insertion piece 2 is located in the opening 3 of the carrier 4. The insertion piece 2 is formed with a thrust face or conical surface 7, at the end thereof which is remote from the collar 5. A longitudinal bore 8 is formed through the insertion piece 2, with a funnel-shaped entry 9 at the end of the insertion piece which includes the collar 5. The thrust part 11 is formed with a longitudinal bore 10, having an opening at one thereof which extends in axial alignment with the longitudinal bore 8 of the insertion piece 2, and which is closed at an opposite end thereof. The thrust part 11 is formed with a thrust face or cone surface 12 which fits complimentarily with the thrust face or conical surface 7 of the insertion piece 2.

The insertion piece 2 and the thrust part 11, which form the holding element 1, are formed by an injection molding process wherein the insertion piece is made from a soft elastic plastics material and the thrust part is made from a rigid plastics material. In order to retain the insertion piece 2 and the thrust part 11 together as the holding element 1, randomly located and elastically deformable ribs 13 and 14 (two shown) bridge the conical surface 7 of the insertion piece and the cone surface 12 of the thrust part, thereby establishing a connection between the insertion piece and the thrust part. The ribs 13 and 14 are made of an elastically deformable material so that they do not prevent mutual displacement of the conical surface 7 and the cone surface 12.

During the injection molding process of the holding element 1, as noted above, both the soft elastic insertion piece 2 and the comparatively more rigid thrust part 11 may be formed in one mold, in which case the elastically deformable ribs 13 and 14, which connect the insertion piece and the thrust part, may be molded in place, within the one mold, at the same time.

As shown in FIG. 1, the holding element 1 may be inserted through the opening 3 of the carrier 4 without difficulty until the marginal lip 6 of the collar 5 is in engagement with the carrier. In contrast to the holding element disclosed in European Patent Application No 890 750 A2, which has the projecting bead formed thereon, there are no projections formed on the holding element 1 which will impede the insertion of the holding element 1 into the opening 3 of the carrier 4, prior to engagement of the collar 5 with the carrier.

Figure 2:
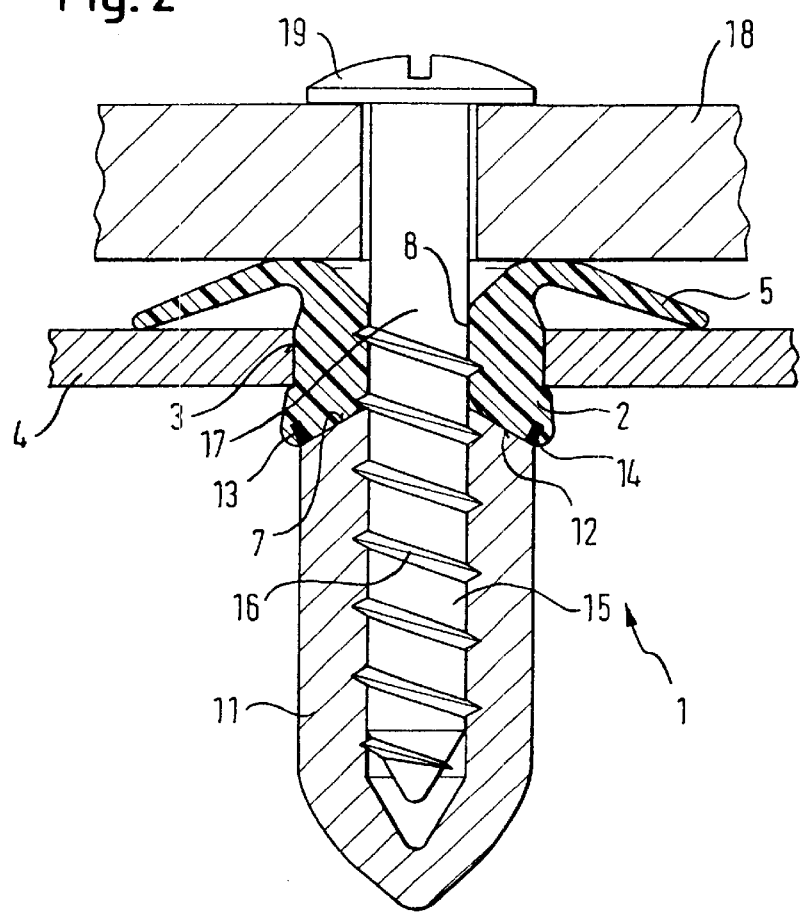
FIG. 2 is a sectional view showing the holding element of FIG. 1 with a screw in assembly therewith in accordance with certain principles of the invention.

As shown in FIG. 2, a screw 15 has been inserted into the axially-aligned bores 8 and 10 of the holding element 1. The screw 15 has a self-cutting thread 16, which has cut into the wall of the bore 19 of the thrust part 11, and is therefore anchored in the rigid thrust part. A shank 17 of the screw 15 has caused considerable expansion of the longitudinal bore 8 of the insertion piece 2 because the diameter of the bore 8 is much smaller than the shank of the screw. Note also that the diameter of the bore 8 is much smaller than the diameter of the bore 12. Because of this structure, and the elastic properties of the insertion piece 2, the portion of the insertion piece within the opening 3 of the carrier 4 may be pressed outward so that the surface of such portion is pressed against the wall of the opening of the carrier.

During the threaded assembly of the screw 15 with the holding element 1, the screw draws the thrust part 11 toward the insertion piece 2, and toward the underside of the carrier 4. The cone surface 12 of the thrust part 11 thereby presses against the conical surface 7 of the insertion piece 2. As a result, the portion of the insertion piece 2 adjacent the conical surface 7 is pressed strongly outward, such that the portion of the insertion piece, which extends below the carrier 4, bulges outward in a bead-like manner. This provides a particularly reliable sealing of the opening 3 of the carrier 4 by means of the insertion piece 2.

As shown in FIG. 2, a component 18, which is to be assembled with the carrier 4, is formed with a hole for receipt of the screw 15. Prior to assembly of the screw 15 with the holding element 1, as described above, the threaded portion of the screw is inserted through the opening of the component 18, and the screw is then inserted into the aligned bores 8 and 10 in the manner described above. Also, the underside of the component 18 engages a top portion of the collar 5 of the insertion piece 2.

As the screw 15 is tightened, the action noted above, wherein the thrust part 11 is drawn toward the insertion piece 2, occurs because of the support of the component 18 on the collar 5, wherein the component is pressed toward the collar 5 by a head 19 of the screw. When the screw 15 is tightened further, the pressure exerted by the screw head 19 upon the component 18 leads to the fastening of the component to the carrier 4. At the same time, the drawing of the thrust part 11, by means of the screw threads 16, leads to the compressed expansion of the portions of the insertion piece, as described above.

Figure 3:
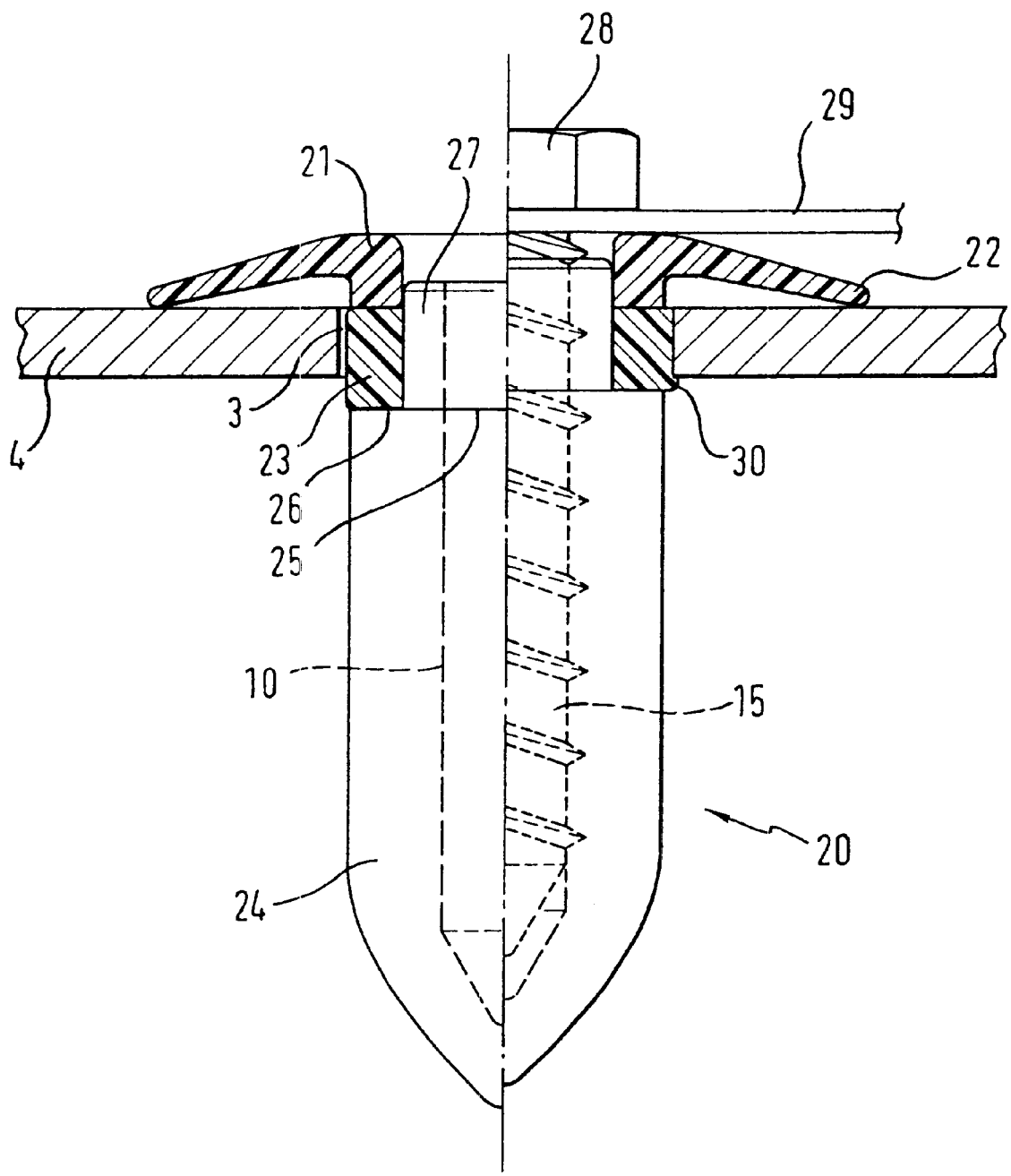
FIG. 3 is a sectional view showing a second embodiment of a holding element in accordance with certain principles of the invention.

As shown in FIG. 3, a second embodiment of a holding element 20 includes an insertion piece 21 with a collar 22 and an elastic ring 23, which is located within the opening 3 of the carrier 4. The collar 22 and the ring 23 are formed together, as one part, during an injection molding process. The holding element 20 further includes a thrust part 24 which is set onto the ring 23, and includes a flat face 25 which presses against an adjacent flat face 26 of the ring 23. By way of the flat face 25, the thrust part 24 verges into a collar 27, which is mounted as a tubular piece on the thrust part. The thrust part 24 and the collar 27 are formed with aligned bores which form the bore 10 for receiving the screw 15. At least the ring 23 is made of a soft elastic plastics material comparable to the material used to make the insertion piece 2 of the holding element 1. The insertion piece 21 may also be made of the soft material. The thrust part 24 is made of a comparatively rigid plastics material comparable to the material used to make the thrust part 11 of the holding element 1

As shown to the left of a vertical centerline in FIG. 3, the holding element 20 is in a loosely inserted position within the opening 3 of the carrier 4, which corresponds to the illustration of FIG. 1 regarding the first embodiment of the holding element 1. As shown to the right of the vertical centerline in FIG. 3, the ring 23 has been compressively expanded and pressed against the wall of opening 3. This is effected by means of the screw 15 having a head 28 which presses a component 29, shown as a thin plate, against the insertion piece 21 and the collar 22. This results in the thrust part 24 being urged toward the insertion piece 21 and the collar 22 and the compressive expansion of the elastic ring 23, in the manner described above with respect to FIG. 2 and the compressive expansion of the insertion piece 2. In the holding element 20, the ring 23 is not only urged against the inner wall of the opening 3 of the carrier 4, also a portion of the ring is compressed to form a bead 30 beneath the carrier 4 which ensures an efficient sealing between the holding element and the carrier. For further details of the mode of use and operation of the holding element 20, reference is made to the use and operation of the holding element 1, which is similar.

In general, the above-identified embodiments are not to be construed as limiting the breadth of the present invention. Modifications, and other alternative constructions, will be apparent which are within the spirit and scope of the invention as defined in the appended claims.

What is claimed is:

1. A holding element for fastening components to a carrier formed with an opening of predetermined diameter, in which the holding element is to be inserted and held, which comprises:
   a. an insertion piece, which is insertable into the opening of the carrier, having a longitudinal insertion-piece bore extending therethrough;
   b. the insertion piece formed with a collar at one end which is to be supported against the carrier;
   c. an insertion-piece thrust face formed at another end of the insertion piece;
   d. a thrust part formed with a thrust-part longitudinal bore having an open and a thrust-part thrust face formed adjacent the open end of the thrust-part bore;
   e. the insertion piece and the thrust part each having an equal external diameter which is smaller than the diameter of the opening of the carrier which the holding element is inserted into;
   f. the bore of the insertion piece of a smaller diameter than the longitudinal bore of the thrust part;
   g. the insertion-piece thrust face and the thrust-part thrust face being interfacing engagement, and the insertion-piece bore being in axial alignment with the thrust-part bore;
   h. the insertion piece being made of a soft elastic plastics material;
   i. the thrust part being made of a material having the stability of a rigid plastics material which is more rigid than the soft elastic plastics material of the insertion piece;
   j. whereby, when a screw is inserted through the insertion-piece bore and into the thrust-part bore, the bore of the insertion piece is compressed to expand within the opening of the carrier in a sealing manner to anchor the holding element with the carrier; and
   k. the collar of the insertion piece is formed in the shape of a dish with a marginal lip for application against the carrier.

2. A holding element for fastening components to a carrier, formed with an opening of predetermined diameter, in which the holding element is to be inserted and held, which comprises:
   a. an insertion piece, which is insertable into the opening of the carrier, having a longitudinal insertion-piece bore extending therethrough;
   b. the insertion piece formed with a collar at one end, which is to be supported against the carrier;
   c. an insertion-piece thrust face formed at another end of the insertion piece;
   d. a thrust part formed with a thrust-part longitudinal bore having an open end and a thrust-part thrust face formed adjacent the open end of the thrust-part bore;
   e. the insertion piece and the thrust part each having an equal external diameter which is smaller than the diameter of the opening of the carrier which the holding element is inserted into;
   f. the bore of the insertion piece of a smaller diameter than the longitudinal bore of the thrust part;
   g. the insertion-piece thrust face and the thrust-part thrust face being in interfacing engagement, and the insertion-piece bore being in axial alignment with the thrust-part bore;
   h. the insertion piece being made of a soft elastic plastics material;
   i. the thrust part being made of a material having the stability of a rigid plastics material which is more rigid than the soft elastic plastics material of the insertion piece;
   j. whereby, when a screw is inserted through the insertion-piece bore and into the thrust-part bore, the bore of the insertion piece is compressed to expand within the opening of the carrier in a sealing manner to anchor the holding element with the carrier;
   k. the insertion-piece thrust face is formed in a conical shape;
   l. the thrust-part thrust face is formed in a cone shape which is counterpart to the conical shape of the insertion-piece thrust face; and
   m. the insertion piece and the thrust part are connected to each other by elastically deformable ribs which interconnect the adjacent thrust faces thereof.

* * * * *